No. 782,013. PATENTED FEB. 7, 1905.
O. S. ELLITHORP.
CORN SHOCKER.
APPLICATION FILED AUG. 24, 1904.

5 SHEETS—SHEET 3.

Witnesses:
Inventor:
Orren S. Ellithorp
By J. C. Warner,
Atty.

No. 782,013. PATENTED FEB. 7, 1905.
O. S. ELLITHORP.
CORN SHOCKER.
APPLICATION FILED AUG. 24, 1904.
5 SHEETS—SHEET 4.
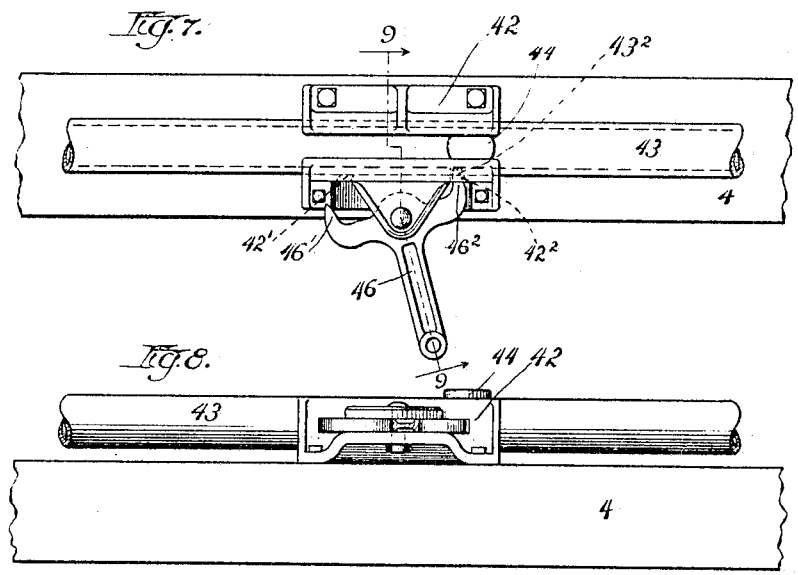
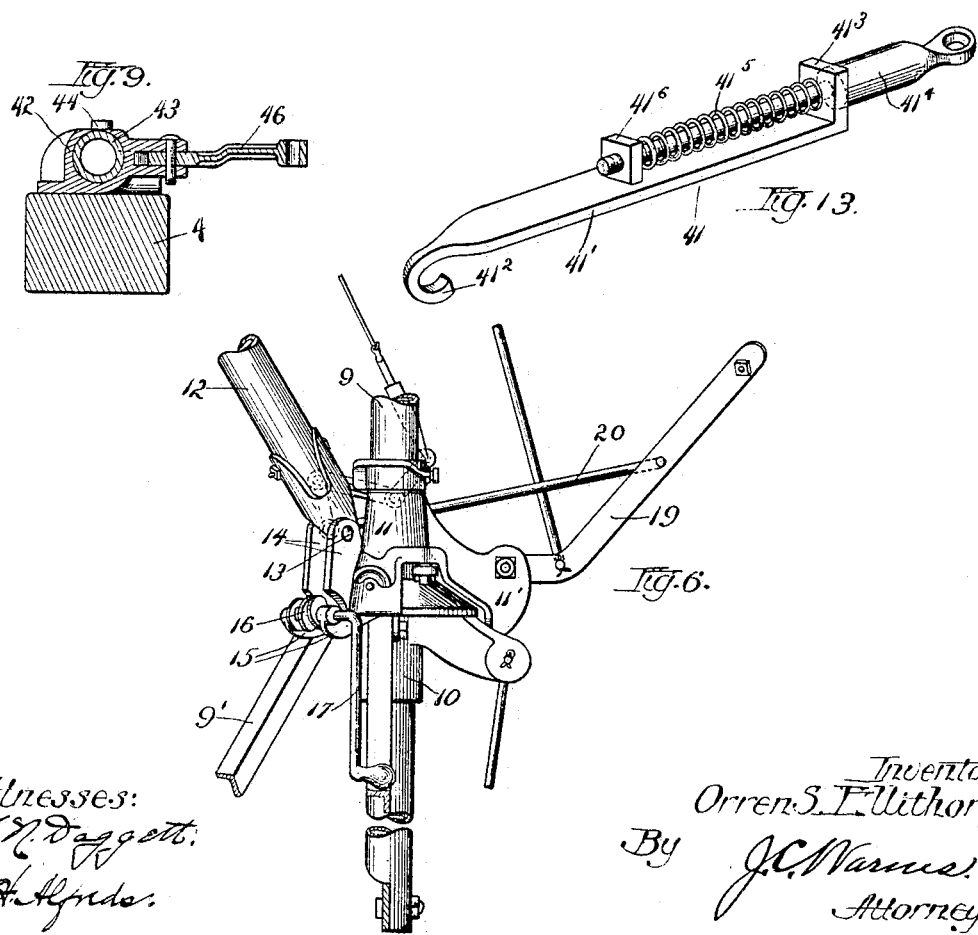
Witnesses:
T. N. Daggett.
T. H. Hynds.
Inventor:
Orren S. Ellithorp.
By J. C. Warnes
Attorney.

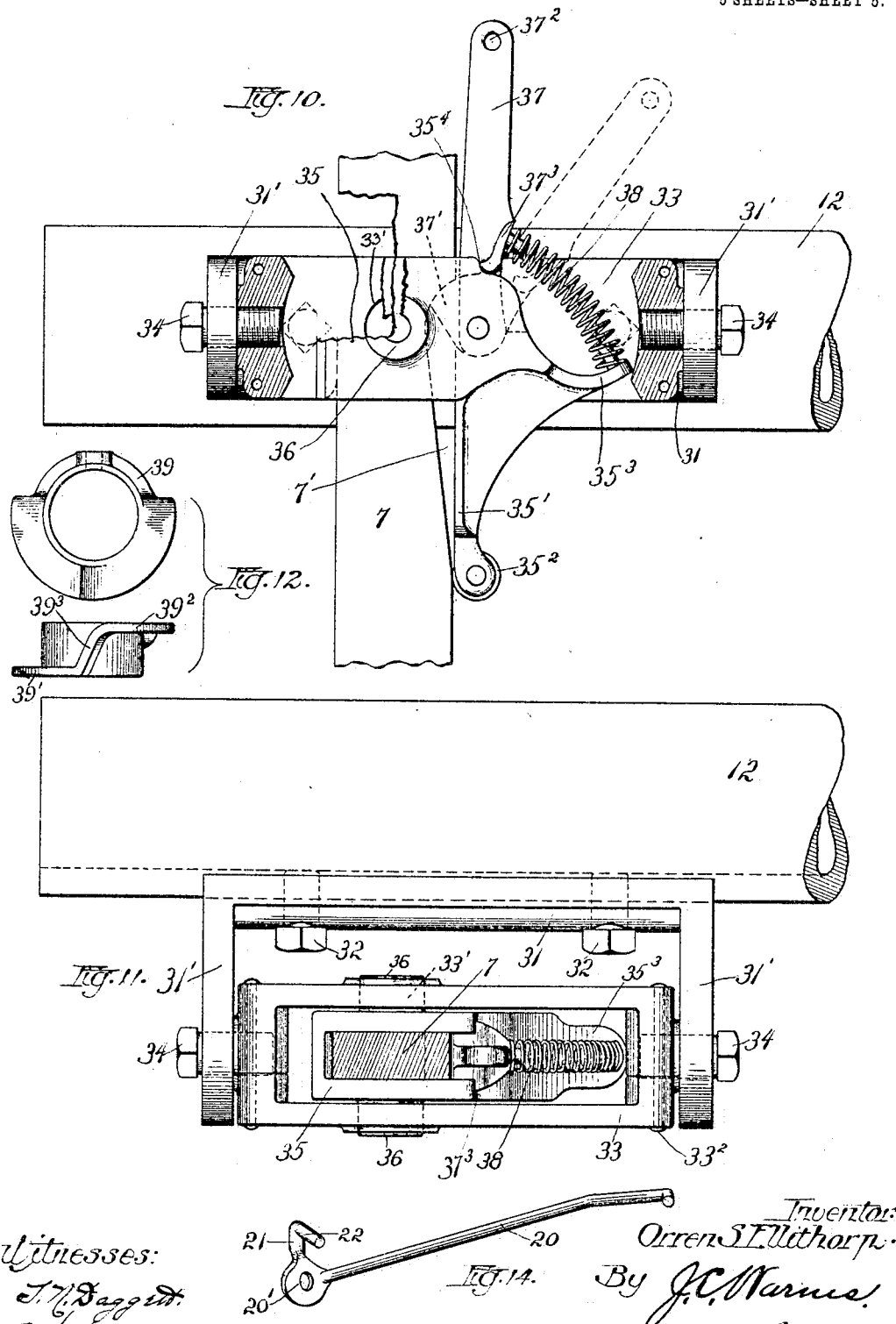

No. 782,013. Patented February 7, 1905.

UNITED STATES PATENT OFFICE.

ORREN SIMMEON ELLITHORP, OF CHICAGO, ILLINOIS, ASSIGNOR TO INTERNATIONAL HARVESTER COMPANY, A CORPORATION OF NEW JERSEY.

CORN-SHOCKER.

SPECIFICATION forming part of Letters Patent No. 782,013, dated February 7, 1905.

Application filed August 24, 1904. Serial No. 221,916.

*To all whom it may concern:*

Be it known that I, ORREN SIMMEON ELLITHORP, a citizen of the United States, residing at Chicago, in the county of Cook and State of Illinois, have invented a new and useful Improvement in Corn-Shockers, of which the following is a complete specification.

This invention relates to the shock-removing device for corn-harvesting machines, and is designed to be used in connection with that type shown in Patent No. 724,515, granted to J. M. Shively April 7, 1903. In this style of machine as heretofore constructed the shock is swung stubbleward from the platform by manual effort, and it frequently happens that the tripping mechanism is released prematurely, thus dropping the shock before it has been swung far enough to clear the platform or the path of the machine in the succeeding round.

The object of this invention is to provide means whereby the shock when raised will be swung stubbleward by its own weight and to also provide automatic and positive means for preventing tripping of the shock-removing mechanism until it has been moved sufficiently stubbleward.

Another object of the invention is to provide improved means whereby the pull of the horses may be applied to lifting and swinging the shock.

Further and subordinate objects will appear in the disclosure of this invention, in which—

Figure 1:
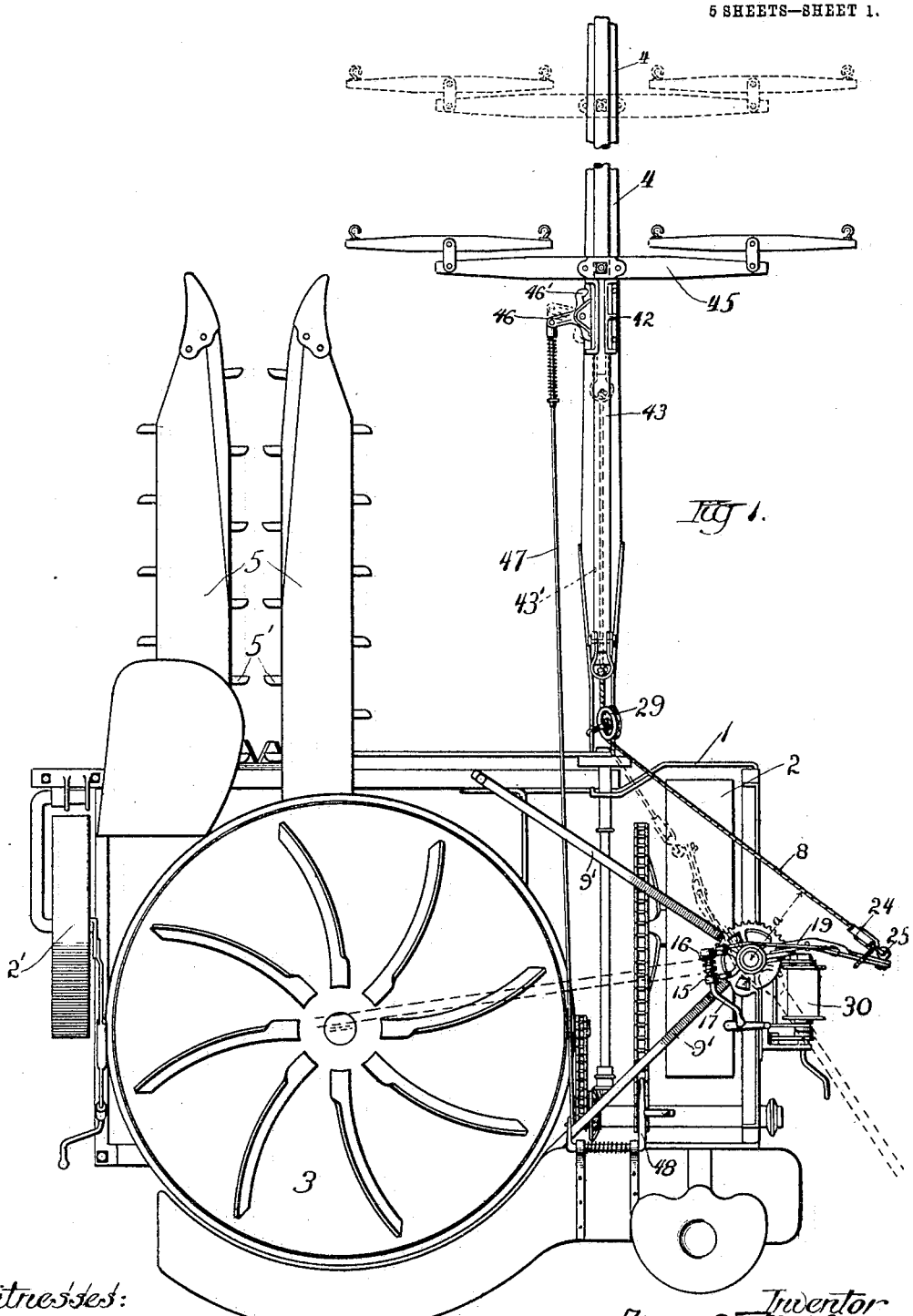
Figure 2:
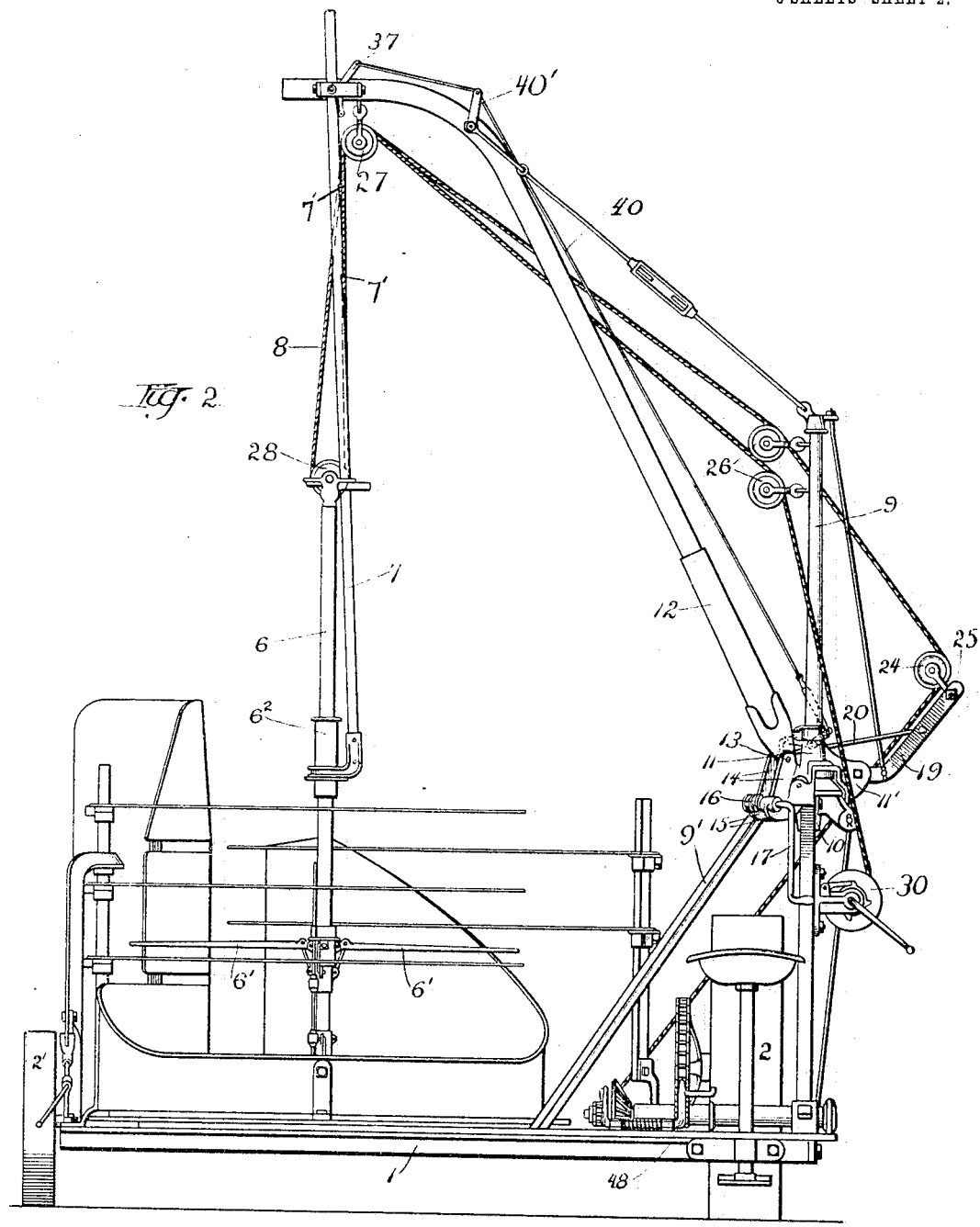
Figure 3:
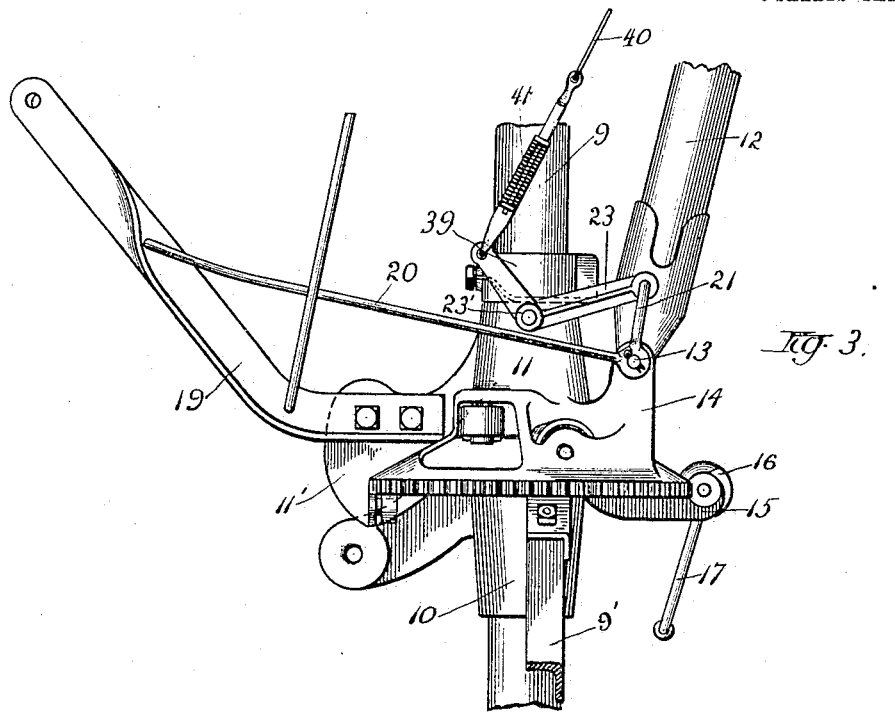
Figure 4:
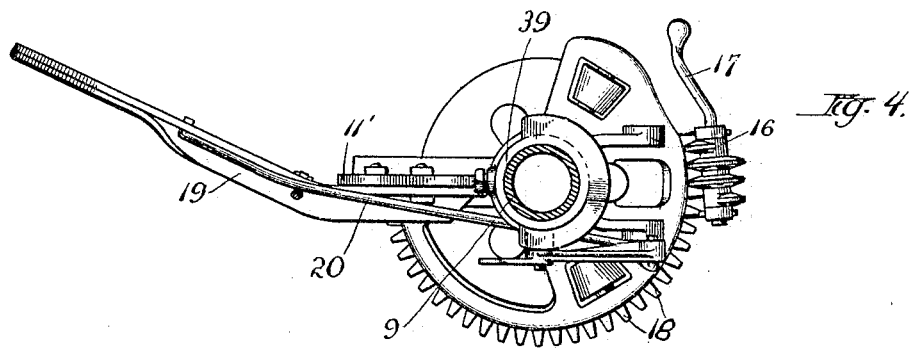
Figure 5:
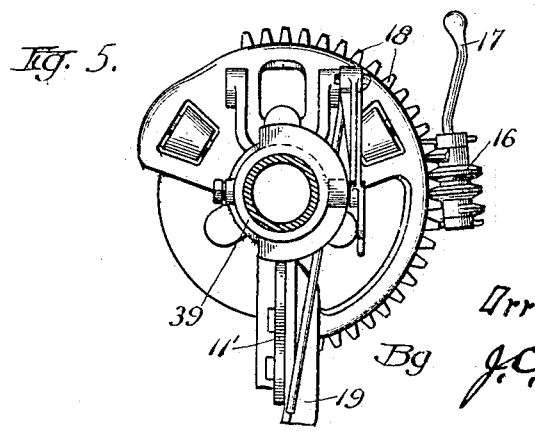

Figure 1 represents a plan view, with parts removed, of a corn-shocker of the type above referred to and in connection with which my improvement is shown. Fig. 2 is a rear elevation of same, the shock-removing mechanism appearing, however, in this view. Fig. 3 is a detail front view of that portion of the main supporting-post of the crane to which is secured the turn-table and turn-table support. Fig. 4 is a plan view of substantially those parts shown in Fig. 3, the boom of the crane, however, not being shown in this view. Fig. 5 is a view corresponding with that shown in Fig. 4 with the turn-table moved through one quadrant. Fig. 6 is a rear elevation corresponding with and substantially of those parts disclosed in Fig. 3. Figs. 7, 8, and 9 are detail views illustrating the construction of the releasing mechanism of the draft attachment, Fig. 7 being a plan view of that portion of the tongue on which is mounted the casting and the dog for engaging the draft-retention bar, Fig. 8 being a grain-side elevation of same, and Fig. 9 a transverse section as indicated by the line 9 9 in Fig. 7. Fig 10 represents a fragmentary view from the rear and partly in section, of the upper end of the crane-boom with adjacent portion of the trip-lever, the trip-lever pawl and associated parts in connection therewith. Fig. 11 is a corresponding plan of the same parts. Fig. 12 represents a plan and side elevation of the cam-sleeve, which is located upon the main supporting-post of the crane immediately above the turn-table and actuates the tripping mechanism. Fig. 13 is a detail perspective illustrating the construction of the yielding link which forms a part of the connecting means extending from the cam-sleeve to the trip-lever pawl, and Fig. 14 is a detail perspective of the tie-rod carried by the turn-table and which supports the laterally-extending sheave-carrying arm.

Referring to the drawings, 1 designates the frame of a corn-shocker of the type above referred to; 2 and 2', the supporting-wheels; 3, the shock-carrying table; 4, the guiding-tongue, and 5 the gathering-boards, on which are mounted the gathering-chains 5'.

6 designates the shock-forming standard, provided with the hinged arms 6'; 7, the trip-lever, releasably secured at its upper end to the crane, and 8 the hoisting-rope, by means of which the shock-forming standard and shock thereon are raised and the shock deposited at one side of the machine.

9 represents the main supporting-post of the crane, located on the stubbleward side of the machine and rigidly held by the braces 9'. To this main supporting-post 9 of the frame is rigidly secured the turn-table support 10, upon which is mounted the turn-table 11, the turn-table being held concentric about the said supporting-post. Upon the turn-table 11 is pivotally mounted the crane-boom 12, the pivotal connection being effected by means of the pin 13 in the lugs 14, which are preferably integral with said turn-table. The turn-table support 10 is provided on its grainward side with the lugs 15. These lugs receive and form bearings for the shaft of the worm-gear 16, to which it is rigidly secured, the said shaft terminating in the crank 17, thereby affording means for operating same. This worm 16 meshes with the toothed segment 18, formed upon the turn-table 11. The effect of this arrangement will be that whenever the crank 17 is rotated the turn-table 11 will be moved upon its support.

For a more detailed description of the crane and its constituent parts reference may be had to Patent No. 724,515 above mentioned; but since these and all the foregoing parts constitute no part of this invention a more specific description herein is not deemed necessary.

One of the new elements in this construction is formed by the arm 19, secured rigidly to a lug 11', which is as one piece with the turn-table 11. This arm 19 projects, preferably, stubbleward, slightly upwardly and rearwardly, and is braced by the tie-rod 20, as clearly shown in Figs. 3 and 14. The inner end of the tie-rod 20 is provided with an aperture 20', which is engaged by the pin 13, forming the pivotal connection of the crane 12 with the turn-table 11. On the inner end of the tie-rod is also formed an upwardly-projecting arm 21, having the lateral projection 22. This lateral projection 22 forms a bearing for the arm 23, the function of which will hereinafter be fully described.

To the outer end of the arm 19 is flexibly secured a sheave 24, the same being secured by the eyebolt 25. 26 26 represent the two sheaves secured near the upper end of the main supporting-post of the crane, 27 the double sheave secured to the upper end of the crane-boom 12, 28 the sheave secured to the upper end of the shock-forming standard 6, and 29 a sheave secured to the frame of the machine near the pivotal connection of the tongue 4 therewith. 30 designates the drum, to which one end of the hoisting-rope 8 is secured. This rope passes upwardly over the said drum and about one of the sheaves 26, thence up through the double sheave 27, thence downwardly to engage the sheave 28, from where it returns, the return-ply passing again through the double sheave 27, thence downwardly over one of the sheaves 26, thence over the sheave 24, which is secured to the outer end of the arm 19. If the shock is to be raised and removed by manual means, which is sometimes desirable, the turn or ply of rope passing downwardly and forwardly over the sheave 24 is secured at a point on the frame of the machine; but if it is desired to employ the draft-animals for such purpose then the said rope is made to pass downwardly and forwardly beneath the sheave 29, the free end being secured to the draft attachment hereinafter described. This arrangement of rope and sheaves amounts to having one of the plies pass about a sheave laterally disposed and rotatably secured with respect to the axis about which the crane moves. The effect of this will be to apply a deflecting force to the rotating crane, the weight suspended by said rope effecting and operating simultaneously with said deflecting force. Should the sheave 24 be placed substantially coincident with the axis of rotation of the crane, then no rotating effect or deflecting force would be obtained, so the virtue of the construction, therefore, lies in having a ply of said hoisting-rope engage a sheave which is laterally disposed with respect to the axis about which it moves. It is also important that the direction in which the free end of the rope 8 extends after passing downwardly over the sheave 24 shall be in a line which will not intersect the axis of rotation; otherwise no rotative effect would be given.

The effective lever-arm in normal position, as shown in Fig. 1, is represented by the distance $a$, this distance increasing as the crane begins to turn, reaching its maximum when the arm 19 assumes a position substantially at right angles with the vertical plane in which lies the rope 8, thence decreasing until it becomes zero, when the said arm and rope are in the position indicated by dotted lines in Fig. 1.

It often occurs that the shock-tripping mechanism is inadvertently released before the proper time, thus depositing the shock upon the edge of the table or immediately in the rear thereof. The following-described positive means is introduced to prevent such inadvertent and premature tripping. To the upper and horizontally-extending portion of the crane 12 is secured the bracket 31, (see Figs. 10 and 11,) said brackets being formed, preferably, of a bar having transversely-deflected ends 31', the longitudinal portion 31 thereof corresponding in curvature with that of the crane-boom 12, to which it is secured by means of the cap-screws 32. Between these projecting ends 31' is secured the two-part housing 33, the said housing being riveted together by the rivets $33^2$ and are secured in position by the cap-screws 34 at either end thereof. This housing 33 is provided with the apertures 33', which receive and form bearings for the trunnions 36 of the trip-lever sleeve 35. This trip-lever sleeve 35 is thus received between the two parts of the said housing and a pivotal bearing formed therewith. 35' is a downwardly-projecting arm integral with said sleeve 35 and provided with the antifriction-roller $35^2$, adapted to form an extended support for the trip-lever, which is engaged by said sleeve. On the stubbleward side of the sleeve 35, when arranged as shown in Fig. 2, is pivotally connected the upwardly-extending pawl-arm 37, provided at its lower end with the pawl-engaging portion 37' and at its upper end with the aperture 37². A spring 38 reacts between a stubbleward-projecting rigid arm 35³ of said sleeve 35 and the said arm 37. Shoulders 37³ upon the arm 37 by engaging the recesses 35⁴ limit the forward movement of the pawl-arm 37. The pawl projection 37' is adapted to engage with any one of the series of recesses 7' on the trip-lever 7 and when so engaged will prevent longitudinal movement thereof. It will be understood by reference to the patent above cited that whenever the trip-lever 7 is free to move longitudinally it cannot effect the tripping of the arms on the shock-forming standard; but whenever said lever is restrained from longitudinal movement, as when locked by the pawl-arm 37, then a slight vertical movement of the shock-forming standard will operate to trip the arms of same. It will also be understood by consulting the above-cited patent in connection with my Patent No. 726,891, May 5, 1903, that the mechanism on the shock-forming standard is released by the lower end of the trip-lever 7 engaging the upper end of the flanged sleeve 6², as shown in Fig. 2. From this it is apparent that by restraining the longitudinal movement of the trip-lever 7 it will release the arms on the shock-forming standard.

The foregoing-described mechanism located at the upper end of the crane-boom, including the pawl-arm 37 and associated coöperating parts, constitutes the trip-lever-locking mechanism. To effect the engagement and disengagement of these parts at the proper time, the following device is provided: A cam-sleeve 39 is rigidly secured to the main supporting-post of the frame 9 immediately above the turn-table 11. This sleeve 39 is provided with the flange 39', substantially flush with the lower margin of said sleeve, and the flange 39², substantially flush with the upper margin of said sleeve with the vertically-inclined connecting portion 39³, the several flanges forming a cam-surface. The construction and arrangement of this sleeve is clearly shown in Fig. 3, which is a front view of the several parts when the crane is in normal position—that is, with its upper end overhanging the center of the shock-forming table. In this figure the depressed portion of the flange is seen to occupy a position lying in the front inner quadrant of the cam-sleeves, the vertically-extending portion 39³ lying to the inner or grain side thereof, while the raised portion 39² extends through the rear inner quadrant of said sleeve. The lever 23 is provided at a position intermediate of its length with the roller 23', which lies beneath and bears against the flanges forming the cam-surface of said sleeve. The stubbleward end of the arm 23 pivots upon the bearing formed by the upwardly-projecting arm 21 of the tie-rod 20, as before described. The opposite or free end of the said lever 23 engages with means which connect it with the pawl-arm 37, said connecting means consisting, preferably, of a light rod 40, engaging the aperture 37² in the pawl-arm 37, the change in direction to conform to the bent crane being effected by means of the lever 40'. Interposed within and forming a part of this connecting means is a spring 41. This spring is preferably made as shown in detail in Fig. 13, in which a strap 41' is provided with an eye 41², engaging the free end of the lever 23 and a transversely-deflected lug-forming portion 41³ at its opposite end. A shouldered eyebolt 41⁴ passes through an aperture in the lug-forming portion 41³. The downwardly-projecting end of said eyebolt receives the spring 41⁵, which reacts between the said lug-forming portion 41³ and the nut 41⁶. This construction of spring renders the minimum length of said connecting means fixed, while its maximum length is determined by the distance between the lug 41³ and the nut 41⁶. As the turn-table 11 rotates it carries with it the lever 23, the roller 23' bearing beneath the cam-surface formed by the flanges 39' and 39². In its normal position and during the first quarter-turn of the crane the lever 23 is held depressed by the flange 39', which, through the spring 41 and the connecting-rod 40, withholds from engagement the pawl-arm 37 from the trip-lever 7. Such position is indicated by dotted lines in Fig. 10. After the crane has been turned through a quarter of a revolution and moved the shock to the rear of the machine the roller 23' on the arm 23 is permitted to move upwardly by the flange 39³ on the sleeve 39, the upward movement being produced by the spring 38. By such movement the pawl-arm 37 is forced to the position shown in full lines in Fig. 10 and into engagement with the trip-lever 7. As these parts have been held disengaged in the movement of the shock through the first quadrant, the shock-carrying mechanism could not by any possible means be inadvertently tripped. The shock is now deposited in this position or swung farther around, if desired, the point being that after it has been swung thus far no harm would result in dropping it by inadvertence or design, as it is already out of the way of the machine for the succeeding round.

In order to utilize the draft of the team to raise the shock from the table, the following-described mechanism is adopted: On the tongue adjacent to the draft attachment when in normal position is secured the casting 42, which is provided centrally with a slotted opening of circular cross-section adapted to receive the retention bar or pipe 43. The pipe 43 is provided with a pin 44 in the top thereof and in the slot of said casting, by means of which said pipe is held against rotative movement, but longitudinal movement allowed. The rear end of this pipe 43 connects with the shock-hoisting rope 8, while the forward end extends to the end of the tongue and receives the neck-yoke of the team. To the pipe adjacent to the casting 42 is secured the doubletree 45. A dog 46, provided with a forward and a rearward point of engagement 46' and 46², respectively, is pivotally secured to the said casting 42. Apertures 42' and 42² are provided in the casting 42, through which the said points may be projected, the apertures in said casting being made to register with corresponding apertures 43' and 43² in the pipe 43. When the parts occupy the position shown by full lines in Fig. 1, the point 46² on the dog 46 projects through the aperture 42² in the casting 42 and the aperture 43² in the pipe 43, thus locking the parts in this position. A trip-rod 47 extends from the dog 46 rearwardly to a foot-lever 48, by means of which the said dog is actuated. When it is desired to raise the shock, the arm of the dog 46 is pushed forwardly, releasing the pipe 43 in the casting 42 and permitting it to pass therethrough. After the shock has been raised the desired amount the said pipe and doubletree occupy the position indicated by dotted lines in Fig. 1. The dog is now shoved forwardly and made to occupy the position shown by dotted lines in same figure, in which position the point 46' thereof will be made to project through the opening 42' in the casting 42 and engage the hole 43' in the pipe 43, thus holding the shock in a suspended position. The shock may now be moved rearwardly and stubbleward by turning the crank 17. The weight of the suspended shock acting on the lever-arm 19 will exert a force tending to rotate the shock, so that very little effort is required to operate the crank. In this movement, as before described, the lever-arm 23 through the cam-sleeve 39 holds the pawl-arm 37 out of engagement with the trip-lever 7, thus making it impossible for the shock to be deposited before the proper time, as before described. When the shock has been turned to a position sufficiently stubbleward, the lever 23 will be permitted to rise by the upward direction taken by the flange 39³, thus causing the said pawl-arm 37 to lock the trip-lever 7. If after engagement of the pawl-arm 37 with the trip-lever 7 the drum 30 is released, thus permitting the shock-forming standard to lower slightly, the tripping mechanism will be actuated as heretofore explained and the shock deposited. The draft attachment will then be moved rearwardly and locked in position again, while the crane will be swung inwardly to a position over the center of the shock-forming table and the operation repeated.

While the foregoing is a description of the preferred construction embodying and disclosing my invention, I do not limit myself to the specific form and arrangement therein set forth, for modifications could well be made in the details thereof and yet come within the spirit and scope of the invention.

What I claim as my invention, and desire to secure by Letters Patent, is—

1. In a corn-shocking machine, in combination, a shock-forming standard, a crane comprising a supporting-post and a crane-boom, a laterally-extending sheave-carrying arm, movable with said boom, about said supporting-post, and a hoisting-rope connecting said crane and shock-forming standard, one ply of said hoisting-rope engaging the sheave on the laterally-extending arm, substantially as and for the purpose set forth.

2. In a corn-shocker, in combination, a shock-forming standard, a lifting-crane arranged to swing about a vertical axis, a laterally-extending sheave-carrying arm movable with said crane, and a hoisting-rope connecting said crane and shock-forming standard and engaging the sheave on said laterally-extending arm, the said rope extending downward from said sheave in a line, the direction of which is non-intersecting with respect to the axis of movement of the said crane, substantially as and for the purpose set forth.

3. In a corn-shocker, in combination, a shock-forming standard, a lifting-crane arranged to swing about a vertical axis, a laterally-extending arm extending in a direction opposite from said crane, and movable therewith, a sheave flexibly secured to the end of said arm, a hoisting-rope connecting said crane and shock-forming standard, one ply of said hoisting-rope engaging the sheave on said arm, substantially as and for the purpose set forth.

4. In a corn-shocker, in combination, a shock-forming standard, a lifting-crane comprising a main supporting-post with sheaves arranged at the upper end thereof and a boom adapted to swing about said post, a hoisting-rope connecting said shock-forming standard and crane, and a sheave-carrying arm arranged at the base of said boom and engaging one of the vertically-extending plies of the hoisting-rope, whereby a force tending to rotate said boom is applied thereto, substantially as set forth.

5. In a corn-shocking machine, in combination, a shock-forming standard, a shock-removing crane, a trip-lever interposed therebetween, a hoisting-rope connecting said shock-forming standard and lifting-crane, and trip-lever-locking mechanism actuated by the swinging movement of said crane for automatically engaging or disengaging the trip-lever from said crane, substantially as and for the purpose set forth.

6. In a corn-shocking machine, in combination, a shock-forming standard, a shock-removing crane, a trip-lever connected to said shock-forming standard and releasably secured to said crane, a pawl for effecting such releasable securement, and a cam and lever actuated by the swinging movement of said crane for operating said pawl, substantially as and for the purpose set forth.

7. In a corn-shocking machine, in combination, a shock-forming standard, a shock-removing crane arranged to swing about a vertical axis and having a boom provided with a laterally-extending sheave-carrying arm, a hoisting-rope connecting said crane and shock-forming standard, one ply of said hoisting-rope engaging said sheave-carrying arm, thereby applying a force which operates to swing said crane, and trip-lever-locking mechanism actuated by the swinging movement of said crane for automatically engaging and disengaging the trip-lever from said cranes, substantially as and for the purpose set forth.

8. In a corn-shocking machine, in combination, a shock-forming standard, a lifting-crane arranged to swing about a vertical axis and having a boom provided with a laterally-projecting sheave-carrying arm, a draft attachment releasably secured to the tongue of the machine, and a hoisting-rope, one ply of which engages said sheave-carrying arm and said draft attachment, whereby the pull applied thereto will operate to raise the shock and swing it stubbleward, substantially as set forth.

9. In a corn-shocking machine, in combination, a shock-forming standard, a lifting-crane arranged to swing about a vertical axis and having a boom provided with a laterally-projecting sheave-carrying arm, a trip-lever-locking mechanism actuated by the swinging movement of said crane, for automatically engaging and disengaging the trip-lever from said crane, a hoisting-rope connecting the said shock-forming standard and lifting-crane, one ply of the rope engaging said sheave-carrying arm, whereby a force is applied which operates to swing said lifting-crane, and a releasably-secured draft attachment connected with said hoisting-rope, substantially as and for the purpose set forth.

10. In a corn-shocking machine, in combination, a shock-forming standard, a crane comprising a supporting-post, a turn-table support secured thereto, a turn-table mounted thereon, and a crane-boom supported upon said turn-table, a trip-lever interposed between said shock-forming standard and crane-boom and releasably secured to the latter, means for swinging said crane, and trip-lever-locking mechanism consisting of a spring-held pawl arranged to engage said trip-lever, a cam-sleeve secured to said supporting-post, a lever pivotally mounted upon said turn-table and actuated by said cam-sleeve when the crane is swung, and connecting means interposed between said lever and spring-held pawl, substantially as and for the purpose set forth.

11. In a corn-shocking machine, in combination, a shock-forming standard, a crane comprising a supporting-post, a turn-table support secured thereto, a turn-table mounted thereon, and a crane-boom supported upon said turn-table, a trip-lever interposed between said shock-forming standard and crane-boom and releasably secured to the latter, means for swinging said crane, and trip-lever-locking mechanism consisting of a spring-held pawl arranged to engage said trip-lever, a cam-sleeve secured to said supporting-post, a lever pivotally mounted upon said turn-table and actuated by said cam-sleeve when the crane is swung, and yielding connecting means interposed between said lever and spring-held pawl, substantially as and for the purpose set forth.

ORREN SIMMEON ELLITHORP.

Witnesses:
WILLIAM R. DOAKE,
CHRIS. CASPERSON.